(12) United States Patent
Arisetty et al.

(10) Patent No.: US 10,522,859 B2
(45) Date of Patent: Dec. 31, 2019

(54) DYNAMIC LOW-POWER CONTROL OF CELL VOLTAGE IN A FUEL CELL STACK DURING LOW-POWER OPERATING MODES

(71) Applicant: GM GLOBAL TECHNOLOGY OPERATIONS LLC, Detroit, MI (US)

(72) Inventors: Srikanth Arisetty, Novi, MI (US); Andrew J. Maslyn, Novi, MI (US); Balasubramanian Lakshmanan, Rochester Hills, MI (US); Robert J. Moses, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 148 days.

(21) Appl. No.: 15/583,389

(22) Filed: May 1, 2017

(65) Prior Publication Data

US 2018/0316027 A1    Nov. 1, 2018

(51) Int. Cl.
*H01M 8/04* (2016.01)
*H01M 8/04858* (2016.01)
*H01M 8/04746* (2016.01)

(52) U.S. Cl.
CPC ..... *H01M 8/0488* (2013.01); *H01M 8/04753* (2013.01); *H01M 2250/20* (2013.01)

(58) Field of Classification Search
CPC ........... H01M 8/0488; H01M 8/04111; H01M 8/04201; H01M 8/04753; H01M 2250/20
See application file for complete search history.

(56) References Cited

U.S. PATENT DOCUMENTS

| 9,437,889 | B2 | 9/2016 | Moses et al. | |
| 2004/0219399 | A1* | 11/2004 | Zhu | B60L 11/1887 429/431 |
| 2015/0125772 | A1* | 5/2015 | Matsusue | H01M 8/04238 429/432 |
| 2017/0271693 | A1* | 9/2017 | Choo | H01M 8/04228 |

\* cited by examiner

*Primary Examiner* — Amy Cohen Johnson
*Assistant Examiner* — Paul D Baillargeon
(74) *Attorney, Agent, or Firm* — Quinn IP Law

(57) ABSTRACT

A fuel cell system includes a fuel cell stack and a controller. The fuel cell stack includes a catalyst and a stack voltage. The controller increases efficiency of the fuel cell stack by minimizing or removing an accumulation of oxides on the catalyst during a low-power operating mode of the fuel cell system. The controller executes a method for dynamically controlling the stack voltage during a detected low-power operating mode. The method includes commanding low-voltage/high-power pulses to the fuel cell stack via the controller at a magnitude and frequency sufficient for minimizing or removing the oxides. The system may include a direct current-direct current (DC-DC) boost converter, with the controller programmed to command the power pulses from the DC-DC boost converter. Or, the controller may be configured to command the power pulses by controlling a feed rate of the oxygen and/or the hydrogen.

14 Claims, 3 Drawing Sheets

DYNAMIC LOW-POWER CONTROL OF CELL VOLTAGE IN A FUEL CELL STACK DURING LOW-POWER OPERATING MODES

INTRODUCTION

A fuel cell stack is an electrochemical device that uses platinum or another suitable catalyst to produce electricity from a paired oxidation/reduction reaction. Fuel cell stacks may be used as a source of direct current electrical power for motor vehicle propulsion, power generation, and other beneficial applications. In motor vehicle applications in particular, the period between turning an ignition on at the onset of a trip and turning the ignition off again upon trip completion is referred to as a vehicle drive cycle. In a vehicle using a fuel cell stack, a significant portion of the drive cycle may be spent idling with the fuel cell stack operating at low power output levels, with the fuel cell stack remaining at a fixed voltage level with a very low current draw. This low power/idling period is referred to as "hold time".

During low-power hold time intervals, the fuel cell stack is typically maintained at a relatively high potential. Such a control action is directed to maximizing stack efficiency, as well as ensuring that higher voltage power is immediately available when exiting the hold time interval. However, oxides may accumulate on the catalyst material at higher sustained voltages. Accumulated oxides tend to decrease catalytic activity over time. As a result, cell voltage levels degrade as the hold time duration increases. The oxides may be removed by maintaining the fuel cell stack at a low potential. However, maintenance of a low cell potential may compromise power performance, particularly when exiting low-power hold time intervals.

SUMMARY

A control method and system are disclosed herein that may be used to improve the operating efficiency of a fuel cell stack. The method involves the dynamic control of stack voltage in the fuel cell stack, particularly during low-power operating modes. Catalytic activity is improved by intermittently applying low-voltage/high-power pulses to the fuel cell stack during the low-power operating mode in order to maximize cell potential. A relationship between decreasing catalytic activity and increasing hold time may be calculated, e.g., via a catalytic model, with low-voltage/high-power pulses provided at a calibrated frequency as a particular control action to be executed by an onboard controller. As a result, the efficiency of the fuel cell stack is increased. The present strategy may consider aging of the fuel cell stack and modify the power pulses accordingly, e.g., the frequency of the low-voltage/high power pulsations may be increased as the fuel cell stack ages to ensure that overall stack efficiency gains are maintained.

In possible embodiments, high-power pulsing during low-power drive cycles or other low-power operating modes may be achieved by decreasing oxygen and/or hydrogen flow through the fuel cell stack. Alternatively, the required power pulses may be electrically injected, e.g., via control of a voltage output of a boost converter. As a result, accumulated oxides are gently removed or minimized from surfaces of the catalyst such that time-averaged catalytic activity is increased during low-power operating modes. The model noted above may be used to calculate cell voltage as a function of oxide coverage and operating factors such as temperature of the stack and/or ambient temperature, relative humidity, and oxygen partial pressure. The pulsing frequency may be determined in real-time using the model.

A fuel cell system is disclosed herein that, in an example embodiment, includes a fuel cell stack and a controller. The fuel cell stack has a catalyst and a stack voltage. The controller increases stack efficiency by removing or minimizing an accumulation of oxides on the catalyst during a low-power operating mode of the fuel cell system. The controller is programmed to detect the low-power operating mode, and to thereafter dynamically control the stack voltage during the detected low-power operating mode. As a programmed control action, the controller commands low-voltage/high-power pulses to the fuel cell stack at a magnitude and frequency sufficient for removing the oxides.

The fuel cell system may include a DC-DC boost converter that is electrically connected to the fuel cell stack via DC voltage bus. The controller in this embodiment may be programmed to command the power pulses from the DC-DC boost converter. Alternatively, the controller may command the power pulses via control of a rate of feeding of oxygen and/or hydrogen into the fuel cell stack.

In the various embodiments, the controller may be programmed with a model describing a relationship between idle/hold time of the fuel cell stack and a set of operating factors, with the controller operable for setting the frequency of the power pulses in real time using the catalytic model. The operating factors may include a temperature (ambient and/or stack), relative humidity, and oxygen partial pressure.

The controller may be programmed to determine an age of the fuel cell stack, and to adjust the frequency of the power pulses using the determined age.

The low-power operating mode may be the idling mode when the fuel cell system is a DC power supply in a vehicle having an idling mode.

A method is also disclosed for dynamically controlling stack voltage in the fuel cell stack. The method includes detecting a low-power operating mode of the fuel cell stack, and then dynamically controlling the stack voltage via a controller during the detected low-power operating mode. As part of the dynamic control, the controller commands low-voltage/high-power pulses to the fuel cell stack at a magnitude and frequency sufficient for removing oxides from the catalyst.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims. Moreover, this disclosure expressly includes any and all combinations and subcombinations of the elements and features presented above and below.

Figure 1:
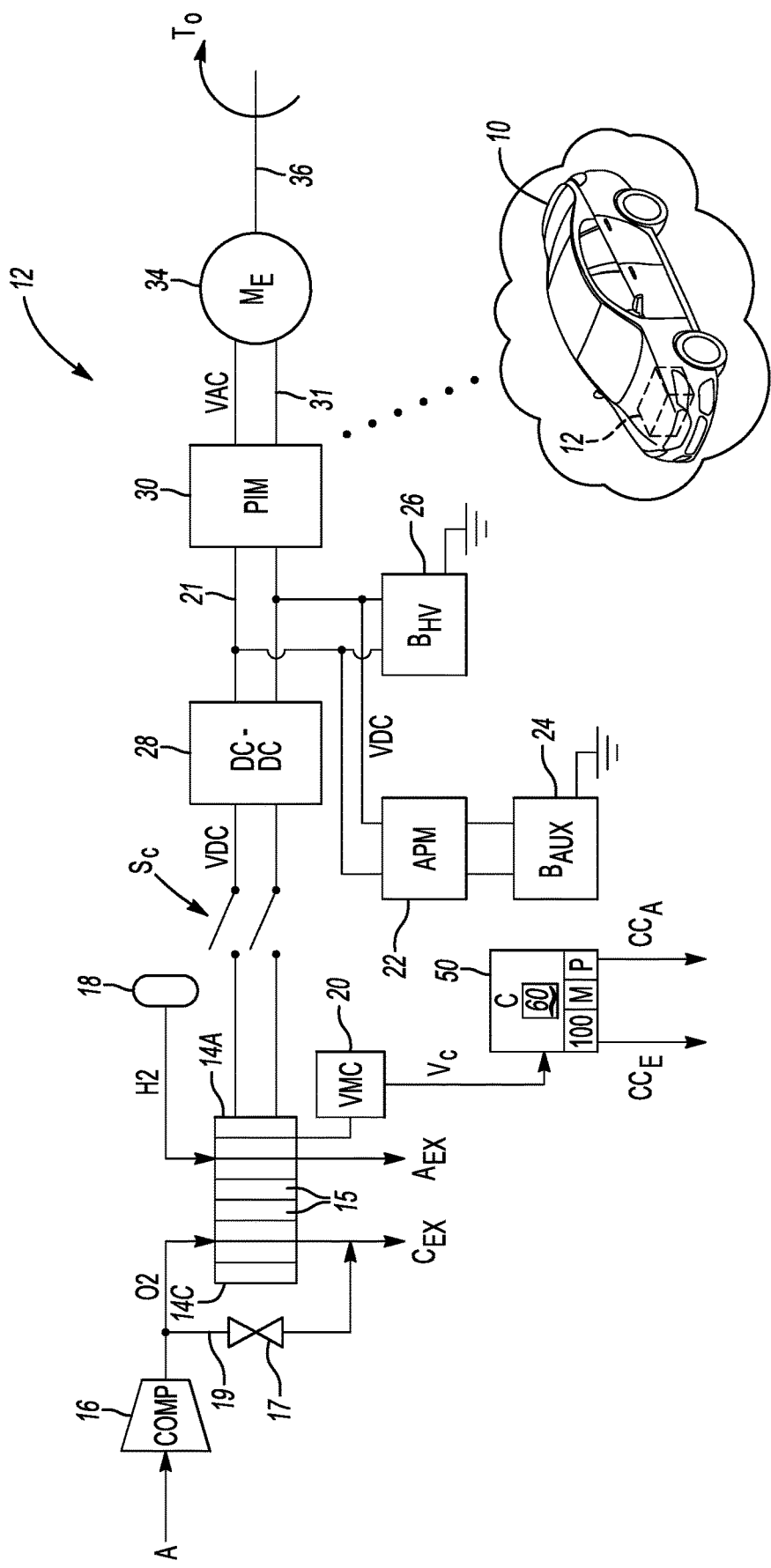
FIG. 1 is a schematic diagram of an example vehicle having a fuel cell stack and a controller configured to improve stack efficiency using targeted low-voltage/high-power pulsing during certain low-power operating modes as set forth herein.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure as defined by the appended claims.

DETAILED DESCRIPTION

Referring now to the drawings, wherein like reference numbers refer to like features throughout the several views, FIG. 1 schematically depicts an example fuel cell system 12. The fuel cell system 12 includes a fuel cell stack 14 of a type adaptable for use as a direct current (DC) power supply in a vehicle 10, for instance a motor vehicle as shown, or marine vehicle, aerospace vehicle, robot, or other mobile platform. The fuel cell stack 14 may also be used in a stationary power plant or other system requiring onboard generation of DC power. For illustrative consistency, the fuel cell stack 14 will be described hereinafter in the context of a propulsion function aboard the vehicle 10 without limiting the fuel cell stack 14 to such applications.

The fuel cell stack 14 includes fuel cells 15 arranged between respective anode and cathode plates 14A and 14C. While the particular type of fuel cell stack 14 and the constituent fuel cells 15 may vary with the application of the fuel cell system 12, in an example embodiment the fuel cells 15 may be a polymer electrolyte membrane/proton exchange membrane (PEM)-type in order to deliver a relatively high power density with low weight and volume. PEM-type fuel cells use a catalyst in the form of platinum or platinum alloy and a solid electrolyte polymer material (not shown). Thus, the oxides noted above may form on the platinum/platinum alloy materials in such an embodiment, ultimately reducing stack voltage. The fuel cells 15, when configured as PEM-type fuel cells, operate using a supply of gaseous hydrogen (arrow H2) from a hydrogen storage tank 18 and a supply of oxygen (arrow O2) supplied from ambient air (arrow A) via a compressor (COMP) 16, or via an oxygen storage tank (not shown).

As part of the fuel cell system 12 depicted in FIG. 1, a controller (C) 50 is programmed with instructions embodying the method 100. The controller 50 is otherwise configured as described below for improving the overall operating efficiency of the fuel cell stack 14. At low current densities, which may be present for approximately 80% or more of the operating time in the vehicle 10, stack efficiency is heavily influenced by stack voltage. Thus, dynamic control of a power request via the method 100 may be used during low-power operating modes to improve catalytic activity of the fuel cell stack 14, specifically by intermittently applying low-voltage/high-power pulses to the fuel cell stack 14 in order to maximize cell voltage during extended hold times.

As described herein with reference to FIGS. 2-5, in order to achieve the desired ends of minimizing oxide formation on the catalyst used within the fuel cell stack 14, the controller 50 may be programmed with a catalytic model 60. The catalytic model 60 in turn may be used by the controller 50 during low-power operating modes of the fuel cell system 12 in order to estimate ongoing changes in catalytic activity occurring with increased hold time, i.e., when idling at low current output levels of the fuel cell stack 14. Optionally, the controller 50 may update the catalytic model 60 over time based on aging of the fuel cell stack 14, e.g., a power pulsing frequency may be increased over time as explained below. As a result of using the method 100, oxides are gently removed from the catalyst of the fuel cell stack 14, thereby allowing the fuel cell stack 14 to operate at higher relative efficiency levels.

Within the example fuel cell system 12 of FIG. 1, a stack bypass line 19 is routed around the fuel cell stack 14. A bypass valve 17 disposed within the bypass line 19 has a variable open/closed position that may be set via the controller 50. Control of the bypass valve 17 allows the controller 50 to regulate operation of the fuel cell stack 14 by setting an amount of oxygen (arrow O2) flowing through or bypassing the fuel cell stack 14. Oxygenated air that is discharged from the bypass valve 17 ultimately rejoins cathode exhaust (arrow $C_{EX}$) expelled from the cathode plate 14C before being vented from the fuel cell stack 14. Anode exhaust (arrow $A_{EX}$) is similarly vented from the anode plate 14A.

The fuel cell system 12 of FIG. 1 further includes a voltage monitoring circuit (VMC) 20. The VMC 20 may be configured to monitor a voltage level of the fuel cell stack 14, hereinafter referred to as a stack voltage, to measure minimum and maximum cell voltages of the individual fuel cells 15, and to calculate an average cell voltage. Such collective voltage control values (arrow $V_C$) may be used by the controller 50 to control operation of the fuel cell stack 14 in response to changing power demands, such as increased driver throttle request in the illustrated vehicular propulsion embodiment.

Additionally, the fuel cell system 12 includes a high-voltage electrical bus 21 that is electrically coupled to the fuel cell stack 14. A high-voltage battery (BHV) 26 connected to the high-voltage electrical bus 21 acts as a power sink or a power supply to alternatively store or supplement DC power provided by the fuel cell stack 14. A DC-DC boost converter 28 positioned between the fuel cell stack 14 and the high-voltage battery 26 may increase a DC voltage level from the fuel cell stack 14 to a higher level suitable for energizing the high-voltage bus 21 and electric devices connected thereto.

For instance, when the fuel cell system 12 is used to power an alternating current (AC) device such as a polyphase electric machine ($M_E$) 34, the power requirement of the electric machine 34 may exceed the level of output from the fuel cell stack 14. The boost converter 28 thus acts to increase the DC voltage supplied to the electric machine 34, with the high-voltage battery 26 also providing DC power to the electric machine 34 as needed. Additionally, a power inverter module (PIM) 30 may be electrically connected to the high-voltage bus 21 and used to convert the DC voltage on the high-voltage bus 21 to an AC voltage (VAC) suitable for energizing phase windings 31 of the electric machine 34, e.g., a traction motor suitable for propelling the vehicle 10. Output torque (arrow $T_O$) from the electrical machine 34 may be delivered to an output member 36 to perform work aboard the vehicle 10 or other system.

Also as part of the fuel cell system 12, a set of switches or contactors ($S_C$) may be controlled via the controller 50 in order to disconnect the fuel cell stack 14 from the remainder of the fuel cell system 12, such as when the vehicle 10 is not running or during a potential high-voltage electrical fault. Auxiliary power to an auxiliary battery ($B_{AUX}$) 24 may be optionally provided within the fuel cell system 12 via an auxiliary power module (APM) 22, such as a DC-DC buck converter, which may be used to reduce voltage levels on the high-voltage bus 21 to lower levels suitable for storage in the auxiliary battery 24, e.g., 12-15 VDC.

Figure 2:
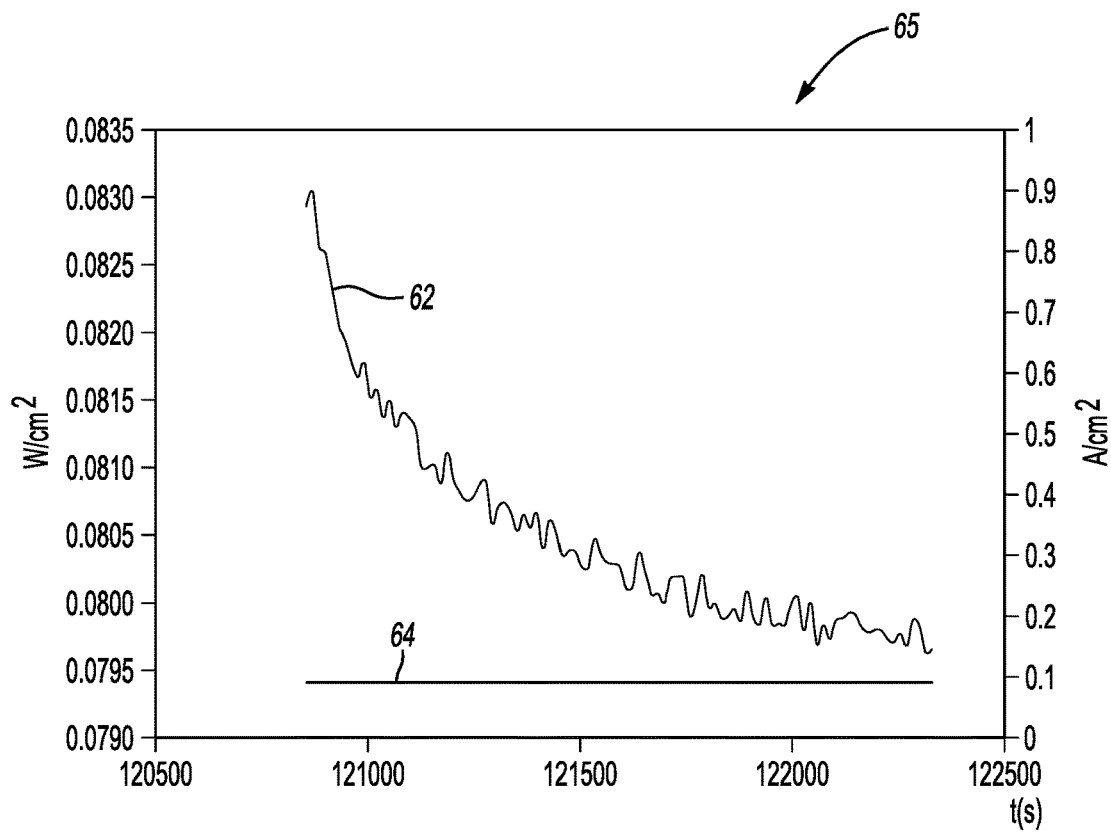
FIG. 2 is a reference power profile describing decreasing stack power with increasing hold time, with time depicted on the horizontal axis and power level and current density depicted on the vertical axis.

Referring to FIG. 2, a power profile 65 describes the phenomenon of decreasing power density (trace 62) of the fuel cell stack 14 of FIG. 1 with increasing hold time, with time depicted in seconds, i.e., t(s). A low current density (trace 64) of about 0.1 amps/centimeters squared (A/cm$^2$) is indicative of an idling vehicle 10 or other low-power operating mode. The power density (trace 62), shown in watts/centimeter (W/cm$^2$), is depicted as decreasing at a pronounced rate after the fuel cell stack 14 is left idle for an extended period of time, shown here as about 34 hours. For the example vehicle 10 of FIG. 1, this may correspond to the vehicle 10 being parked and left unused over a typical weekend.

Figure 3:
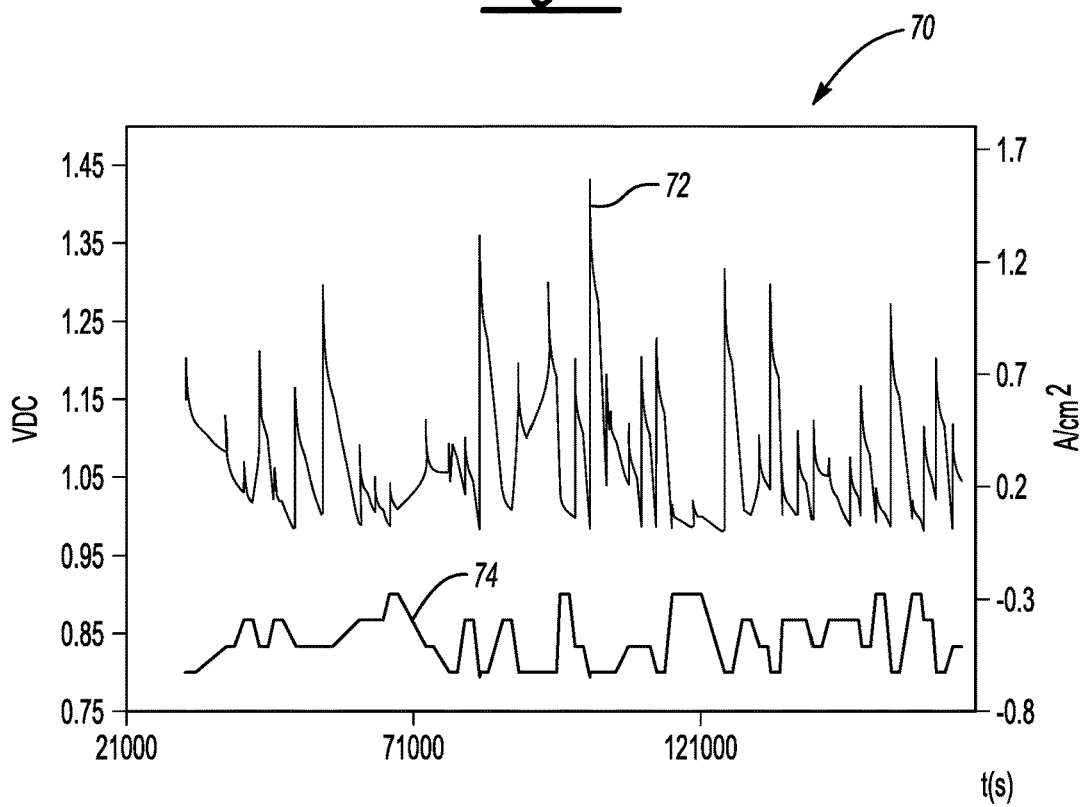
FIG. 3 is a power profile with periodic low-voltage/high-power pulses, with time depicted on the horizontal axis and power level and cell voltage depicted on the vertical axis.
Figure 4:
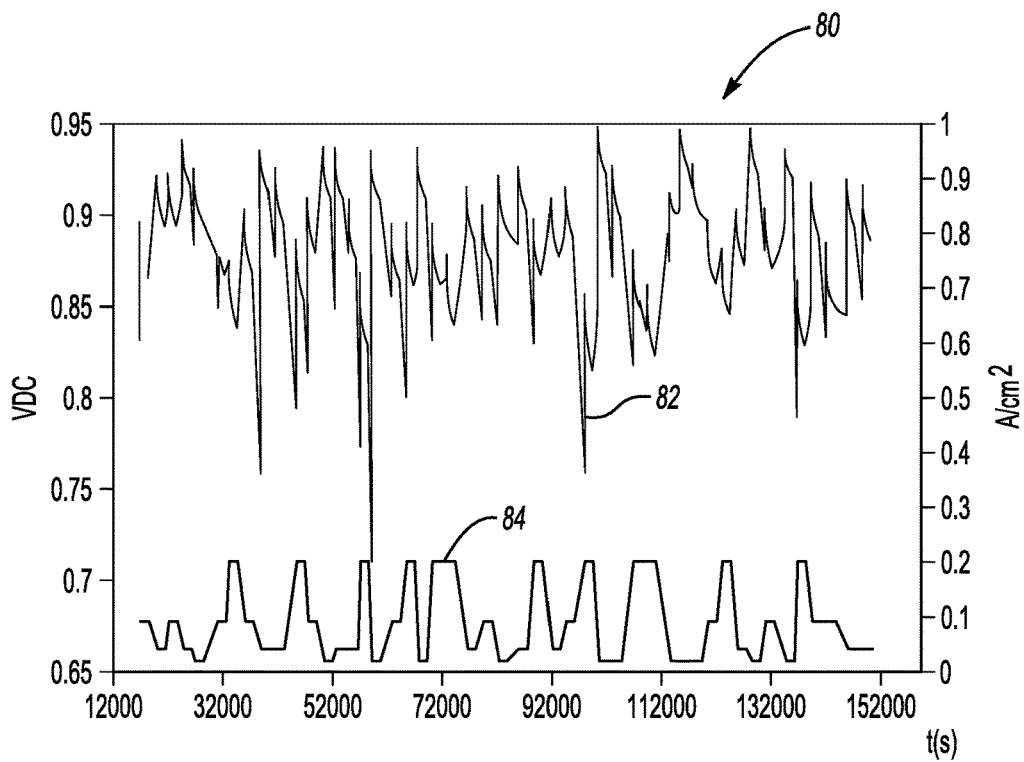
FIG. 4 is another power profile with periodic low-voltage/high-power pulses, and depicting age-related voltage decay, with time depicted on the horizontal axis and cell voltage and current density depicted on the vertical axis.

FIGS. 3 and 4 depict the decay of stack current and voltage, respectively, at a given hold potential, temperature, relative humidity, and oxygen partial pressure level. In FIG. 3, traces 70 include the current density (trace 72) and voltage (trace 74) of the fuel cell stack 14. Similarly, traces 80 of FIG. 4 include current density (trace 82) and voltage (trace 84) of the fuel cell stack 14. The decay rate is thus observed to be a function of specific operating conditions, and thus may be modeled for a given fuel cell stack 14 via the catalytic model 60, which in turn is accessible in real time by the controller 50. Using the catalytic model 60, the controller 50 is thus able to determine the timing and magnitude of intermittent low-voltage/high-power pulses to the fuel cell stack 14 during low-power operating modes as part of the method 100.

Figure 5:
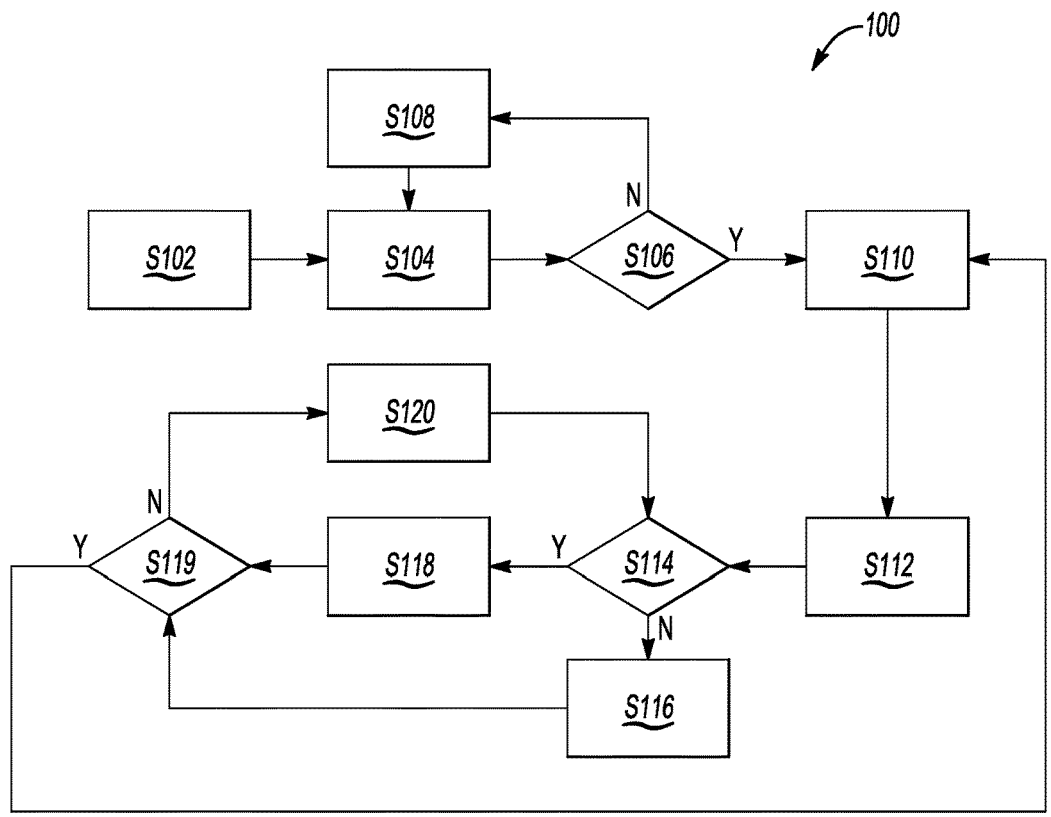
FIG. 5 is a flow chart describing an example method for dynamically controlling cell voltage during low-power operating modes in the fuel cell system shown in FIG. 1.

FIG. 5 depicts an example embodiment of the method 100 noted above. Aspects of the method 100 may be implemented through computer-executable instructions, i.e., software applications or application programs executed by the controller 50. The software may be stored on a variety of memory (M) of the controller 50, including computer-readable such as CD-ROM, magnetic disk, bubble memory, and semiconductor memory, such as various types of RAM or ROM. Moreover, although depicted as a single controller 50 in FIG. 1, aspects of the method 100 may be practiced in distributed-computing environments in which tasks are performed by remote-processing devices linked through a communications network, e.g., a controller area network (CAN) bus (not shown). Although a specific algorithm is described with reference to FIG. 5, other methods of implementing the example machine-readable instructions may be used within the scope of the disclosure.

Beginning with step S102, as a threshold entry condition to the method 100, the controller 50 may first determine whether a low-power operating mode is active, e.g., an idling/low-power portion of a drive cycle of the vehicle 10. The method 100 proceeds to step S104 when the threshold entry condition is satisfied.

Step S104 includes calculating the efficiency of the fuel cell stack 14 for the present drive cycle. For instance, step S104 may entail performing the following operation:

$$P_{GROSS} = I \cdot V$$
$$P_{NET} = P_{GROSS} - P_{PARASITIC}$$
$$P_{NET} = P_{GROSS} - P_{PARASITIC}$$
$$n_{H2} = \frac{I}{2F} + n_{XOVER} + n_{BLEED}$$
$$\eta = \frac{P_{NET}}{(n_{H2} \cdot 242 \text{ kJ/mol})}$$

where $P_{GROSS}$ is the stack gross power generation in kW, I is the stack current in amps, V is the stack voltage in volts, $P_{NET}$ is the FCS net power provided to the vehicle in kW, $P_{PARASITIC}$ is the power consumption from other components in the FCS (i.e. the compressor, coolant pump, etc.) in kW, F is Faraday's constant (96,485 C/mol e$^-$), $n_{X\text{-}OVER}$ is hydrogen cross-over from anode to cathode through the fuel cell membrane (PEM) in mol/s, $n_{BLEED}$ is hydrogen loss due to the periodic, intentional bleeding of the H2/N2 mixture from the anode side of the fuel cell stack in mol/s, and η is the stack efficiency. The method 100 proceeds to step S106 once the efficiency has been calculated.

At step S106, the controller 50 next determines whether the stack efficiency calculated at step S104 is less than a calibrated threshold stack efficiency, i.e., a calibrated minimum stack efficiency needed for maintaining low-power drive cycle operations. The method 100 proceeds to step S108 when the calculated stack efficiency exceeds the threshold stack efficiency, and to step S110 when the calculated stack efficiency is less than the threshold stack efficiency.

Step S108 includes waiting through a calibrated duration before repeating step S104. Step S108 is reached when stack efficiency from step S104 remains higher than the threshold stack efficiency, meaning that power pulsing is not yet required. Sufficient time is thus allowed to pass for efficiency decay to occur before repeating step S104.

Step S110 includes periodically applying low-voltage/high-power pulses to the fuel cell stack 14. For instance, step S110 may include applying a calibrated number (n) of equally-spaced pulses of a fixed magnitude. As part of step S110, the controller 50 may include calculating a modeled efficiency, i.e., the efficiency of the fuel cell stack 14 after injection of the low-voltage/high-power pulses. The pulses can be less than about 10 seconds in duration, and should ideally drive the voltage to less than about 0.7 VDC per cell to assure effective removal of the platinum oxide layer. Pluses may or may not be equally spaced, and could include a single pulse if sufficient. The method 100 then proceeds to step S112.

At step S112, the controller 50 iteratively evaluates the calibrated number (n) of low-voltage/high-power pulses from step S110 so that the modeled efficiency is equal to the minimum stack efficiency needed for sustaining low-power operating modes from step S106. In other words, step S112 includes adjusting the duration between the applied pulses to maintain the stack efficiency at or above the minimum efficiency. The method 100 then proceeds to step S114.

Step S114 may entail determining whether the calibrated number (n) of low-voltage/high-power pulses is less than a calibrated threshold number (N) of such pulses, with the number (N) driven by such factors as battery capacity and durability. Thus, step S114 ensures that the performance and integrity of the high-voltage battery 26 of FIG. 1 is maintained. The method 100 proceeds to step S118 when the calibrated number (n) of low-voltage/high-power pulses from step S110 is less than the calibrated threshold number (N) of such pulses, and to step S116 in the alternative when n>N.

At step S116, the method 100 includes applying the N pulses to the drive cycle and then calculating stack efficiency for the low-power drive cycle. The method 100 then proceeds to step S119.

Step S118 includes applying the (n) pulses during the present drive cycle, calculating stack efficiency after applying the (n) pulses, and then proceeding to step S119.

Step S119 includes determining whether the calculated stack efficiency from steps S116 or S118 during the low-power drive cycle is less than the minimum stack efficiency at low-power. If so, the method 100 proceeds to step S110. The method 100 otherwise proceeds to step S120.

At step S120, the controller 50 next increments a pulse counter such that the calibrated number (n) of pulses is equal to (n+1). The method 100 then proceeds to step S114.

Using the method 100 as described above, oxide coverage of a catalyst material used in the construction of the fuel cell stack 14 of FIG. 1 may be removed or minimized. The controller 50 may execute method 100 in an optimal manner by quantifying a magnitude and frequency of low-voltage/high-power pulses to the fuel cell stack 14 as a function of operating factors such as ambient and/or stack temperature, relative humidity, and oxygen partial pressure, and then selectively applying the low-voltage/high-power pulses during low-power operating modes, specifically those having a low current density matching the particular conditions in the catalytic model 60. The oxide reduction associated with injecting the low-voltage/high-power pulses, whether via control of the boost converter 28 via a first set of control signals (arrow $CC_E$) or via control of an amount of airflow into the fuel cell stack 14 via a second set of control signals (arrow $CC_A$), may be considered against the loss in efficiency due to associated power costs.

Possible control actions for providing the low-voltage pulses may include control of oxygen (O2) flow through the cathode plate 14C of the fuel cell stack 14 and/or bleeding of hydrogen (H2) from the anode plate 14A. That is, the controller 50 may be configured to command the low-voltage/high-power pulses by controlling a rate of the feeding of at least one of the oxygen (O2) via the compressor 16 and the hydrogen (H2) from the storage tank 18. Alternatively, low-voltage/high-power pulses may be injected into the fuel cell stack 14 via the boost converter 28. Flow control of the fuel cell stack 14 has a slower expected response time, but would be essentially transparent to an operator of the vehicle 10, while active power control achieves a fast response time but may be perceived by an operator. In either approach, the frequency of pulsation at low-power operating modes/idling is determined by the controller 50 in a manner suitable for ensuring that the stack efficiency of the fuel cell stack 14 remains above a calibrated minimum fixed stack efficiency.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; modifications, changes, and variations apparent from the foregoing descriptions are within the scope of the disclosure as defined in the appended claims. Moreover, the present concepts expressly include combinations and/or subcombinations of the preceding elements and features.

What is claimed is:

1. A fuel cell system comprising:
   a fuel cell stack having a catalyst and a stack voltage; and
   a controller configured to minimize or remove an accumulation of oxides on the catalyst during a low-power operating mode of the fuel cell system, wherein the controller is programmed with a catalytic model describing a relationship between an idle/hold time of the fuel cell stack corresponding to the low-power operating mode and a plurality of operating factors, including an ambient temperature or a temperature of the fuel cell stack, relative humidity, and oxygen partial pressure to the fuel cell stack, the controller being configured to:
   detect the low-power operating mode;
   determine a magnitude and frequency of periodic low-voltage/high-power pulses using the catalytic model, the magnitude and frequency being sufficient for minimizing or removing the accumulation of the oxides; and
   dynamically control the stack voltage in real-time during the detected low-power operating mode by commanding the periodic low-voltage/high-power pulses to the fuel cell stack at the magnitude and frequency sufficient for minimizing or removing the accumulation of the oxides, thereby increasing a baseline efficiency of the fuel cell stack.

2. The fuel cell system of claim 1, further comprising a direct current (DC)-DC boost converter that is electrically connected to the fuel cell stack via a DC voltage bus, wherein the controller is programmed to command the low-voltage/high-power pulses from the DC-DC boost converter.

3. The fuel cell system of claim 1, wherein the fuel cell stack includes a cathode plate and an anode plate, the fuel cell system further comprising:
   a compressor operable for feeding oxygen to the cathode plate; and
   a hydrogen storage tank operable for feeding hydrogen to the anode plate;
   wherein the controller is configured to command the low-voltage/high-power pulses by controlling a rate of the feeding of at least one of the oxygen and the hydrogen.

4. The fuel cell system of claim 3, wherein the controller is configured to command the low-voltage/high-power pulses via controlling the rate of the feeding of the oxygen and the hydrogen.

5. The fuel cell system of claim 1, wherein the controller is programmed to determine an age of the fuel cell stack, and to adjust the frequency of the low-voltage/high-power pulses using the determined age.

6. The fuel cell system of claim 1, wherein the fuel cell system is a DC power supply in a vehicle having an idling mode, and wherein the low-power operating mode is the idling mode.

7. A method for dynamically controlling a stack voltage in a fuel cell stack having a catalyst, the method comprising:
   detecting a low-power operating mode of the fuel cell stack;
   setting a magnitude and a frequency of periodic low-voltage/high-power pulses in real time using a catalytic model of a controller, the catalytic model describing a relationship between an idle/hold time of the fuel cell stack corresponding to the low-power operating mode and a plurality of operating factors, including relative humidity, oxygen partial pressure to the fuel cell stack, and an ambient temperature or a temperature of the fuel cell stack, wherein the magnitude and frequency are sufficient for minimizing or removing an accumulation of oxides from the catalyst; and dynamically controlling the stack voltage via the controller during the detected low-power operating mode by commanding the periodic low-voltage/high-power pulses to the fuel cell stack at the magnitude and frequency sufficient for minimizing or removing an accumulation of oxides from the catalyst, thereby increasing a baseline efficiency of the fuel cell stack.

8. The method of claim 7, including a direct current (DC)-DC boost converter that is electrically connected to the fuel cell stack via a DC voltage bus, wherein dynamically controlling the stack voltage includes commanding the low-voltage/high-power pulses from the DC-DC boost converter.

9. The method of claim 7, wherein the fuel cell stack includes a cathode plate and an anode plate, wherein dynamically controlling the stack voltage includes controlling a rate of the feeding of at least one of oxygen and hydrogen into the respective cathode plate and anode plate.

10. The method of claim 7, wherein dynamically controlling the stack voltage includes controlling the rate of the feeding of the oxygen and the hydrogen.

11. The method of claim 7, further comprising determining an age of the fuel cell stack via the controller and adjusting the frequency of the low-voltage/high-power pulses using the determined age.

12. The method of claim 7, wherein the fuel cell system is a DC power supply in a vehicle having an idling mode, and wherein the low-power operating mode is the idling mode.

13. A vehicle comprising:
a polyphase electric machine coupled to an output member of the vehicle, and configured to deliver output torque to the output member;
a DC-DC boost converter;
a power inverter module electrically connected to the DC-DC boost converter and to the polyphase electric machine; and
a fuel cell system electrically connected to the boost converter, the fuel cell system comprising:
a fuel cell stack having a catalyst and a stack voltage; and
a controller configured to minimize or remove an accumulation of oxides on the catalyst during a low-power operating mode of the fuel cell system, wherein the controller is programmed with a catalytic model describing a relationship between an idle/hold time of the fuel cell stack corresponding to the low-power operating mode and a plurality of operating factors, including relative humidity, oxygen partial pressure to the fuel cell stack, and an ambient temperature or a temperature of the fuel cell stack the controller being configured to:
detect the low-power operating mode;
determine a magnitude and a frequency of periodic low-voltage/high-power pulses using the catalytic model, the magnitude and frequency being sufficient for minimizing or removing the accumulation of the oxides; and
dynamically control the stack voltage in real-time during the detected low-power operating mode by commanding the periodic low-voltage/high-power pulses to the fuel cell stack at the magnitude and frequency sufficient for minimizing or removing the accumulation of the oxides, thereby increasing a baseline efficiency of the fuel cell stack.

14. The vehicle of claim 13, wherein the controller is configured to determine an age of the fuel cell stack, and to adjust the frequency of the low-voltage/high-power pulses using the determined age of the fuel cell stack.

* * * * *